O. ZARTH.
REPAIR SPOKE FOR WHEELS.
APPLICATION FILED AUG. 23, 1912.
1,059,098.
Patented Apr. 15, 1913.
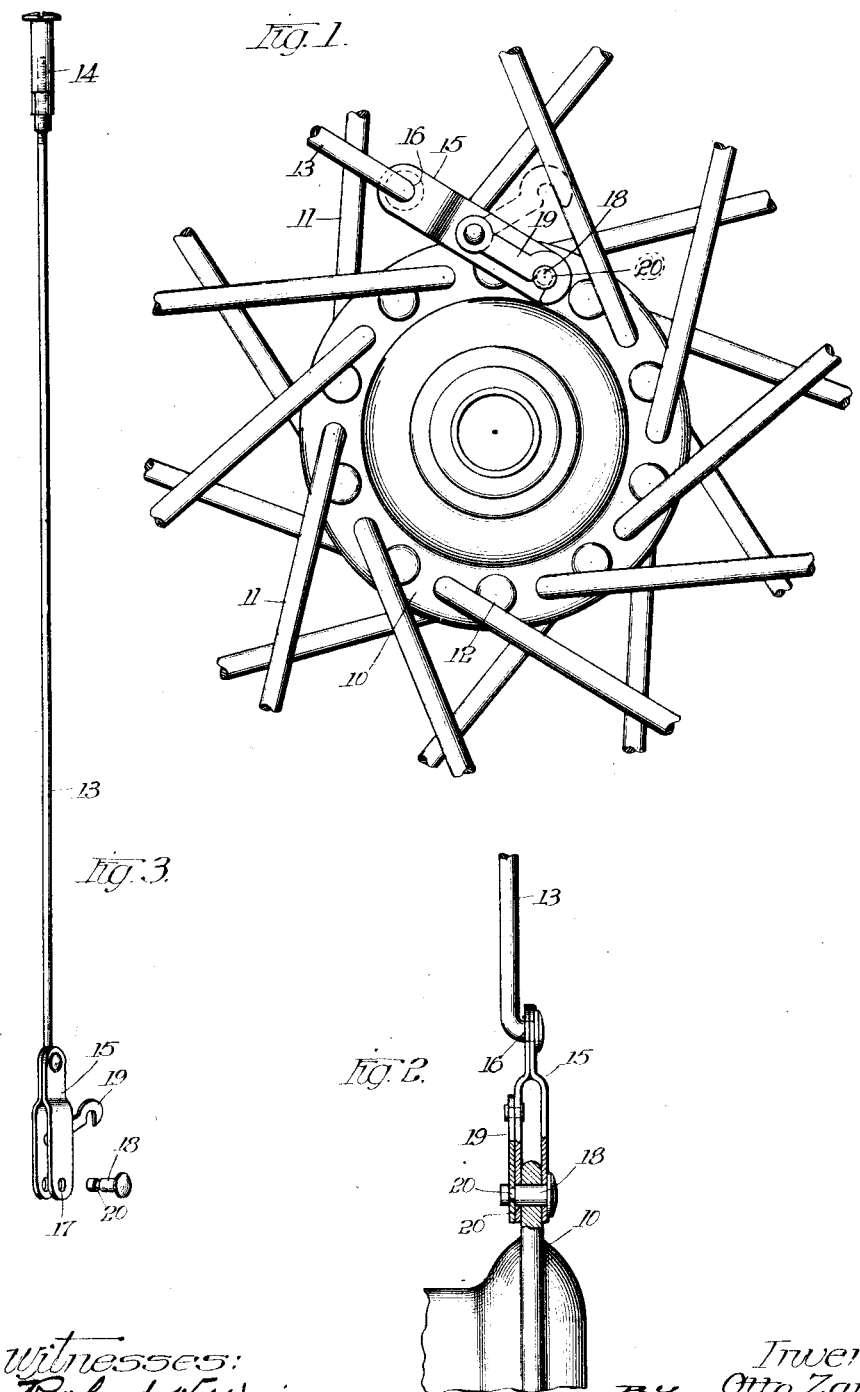

UNITED STATES PATENT OFFICE.

OTTO ZARTH, OF AURORA, ILLINOIS.

REPAIR-SPOKE FOR WHEELS.

1,059,098.  Specification of Letters Patent.  Patented Apr. 15, 1913.

Application filed August 23, 1912. Serial No. 716,636.

*To all whom it may concern:*

Be it known that I, OTTO ZARTH, a citizen of the United States, and resident of Aurora, county of Kane, and State of Illinois, have invented certain new and useful Improvements in Repair-Spokes for Wheels, of which the following is a specification, and which are illustrated in the accompanying drawings, forming a part thereof.

The invention relates to spokes for vehicle wheels of the suspension type, such spokes being formed of wire or light rods; and its object is to provide a repair spoke which may be readily secured in place of a broken spoke and without requiring special tools or the removal of the wheel from its mountings.

In bicycle and motorcycle practice it is usual to form the spokes of wire or light rods, the outer end of the spoke being attached to the rim wheel by means of a threaded nipple, and its inner end being hooked into the hub flange and secured in place by an enlarged head. These wheels are usually so made, particularly those to which driving power is applied, that the spokes cannot be inserted without demounting the wheel, an operation which is difficult and laborious without special tools. The improved repair spoke forming the subject of this application will enable a user while on the road to readily replace a broken spoke which will perform the function of the original spoke until it is convenient to substitute for it a duplicate of the original.

In the accompanying drawings, Figure 1 is a detail side view of the central portion of a wheel, one of the improved repair spokes being shown in connection therewith; Fig. 2 is a detail sectional view of the hub and of the inner end of the repair spoke, shown partly in elevation; and Fig. 3 is a full view of the repair spoke, the attaching elements at its inner end being disconnected.

An ordinary motorcycle wheel hub is shown at 10, the usual spokes employed in such a wheel being represented at 11 and being shown as attached to the hub in the usual way by having their inner ends bent to hook form and projecting through apertures in the hub flange, and being headed up, as shown at 12, to prevent their withdrawal from the hub apertures. These spokes are of wire or light rods.

The repair spoke is formed of similar material, as shown at 13, its outer end being provided with the usual threaded nipple 14, by which it may be attached to the rim wheel in the same manner as the permanent spokes. The body portion 13 of the repair spoke is of less length than the regular spokes, and is provided at its inner end with means for attaching it to the flange of the hub, such means being shown as taking the form of a yoke 15, having an eye into which the hook and headed end 16 of the rod 13 is entered and being adapted to straddle the hub flange, the two legs of the yoke being apertured, as shown at 17, to receive a retaining pin 18, which also passes through the aperture in the hub flange provided for engagement by the regular spoke which shall have been removed. In order to hold the pin 18 in place, a latch hook 19 is pivotally attached to the outer face of one of the legs of the yoke 15 and engages the inner end of the pin, the latter being provided with an annular groove, as shown at 20, for receiving it.

I claim as my invention—

1. A repair spoke comprising a body section, an apertured plate attached to the inner end of the body section, and a pin for passing through the aperture of the plate and a hub flange aperture.

2. A repair spoke comprising a body section, a yoke attached to the inner end of the body section and adapted to straddle the flange of a vehicle wheel and having its legs provided with alined apertures, and a pin for passing through such apertures and a hub flange aperture.

3. In a repair spoke, in combination, an attaching head having transverse apertures at both ends, a rod having one of its ends hooked into one of the apertures of the head, the end of the hook being headed, and a pin for passing through the aperture at the other end of the head and an aperture in a hub flange.

4. In a repair spoke, in combination, a forked head having a transverse aperture in its stem and alined apertures in its legs, a rod hooked into the aperture in the stem of the head and having the end of its hook headed, and a pin for passing through the apertures in the legs of the head and a hub flange aperture.

OTTO ZARTH.

Witnesses:
  Jos. M. Frey,
  Gus Metzger.